US011928788B2

(12) United States Patent
Yao

(10) Patent No.: US 11,928,788 B2
(45) Date of Patent: *Mar. 12, 2024

(54) HANGER GENERATION IN COMPUTER-AIDED DESIGN PROGRAMS

(71) Applicant: EVOLVE MEP, LLC, Atlanta, GA (US)

(72) Inventor: Xiao Chun Yao, Marietta, GA (US)

(73) Assignee: EVOLVE MEP, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/339,344

(22) Filed: Jun. 4, 2021

(65) Prior Publication Data

US 2021/0295608 A1    Sep. 23, 2021

Related U.S. Application Data

(63) Continuation of application No. 17/003,945, filed on Aug. 26, 2020, now Pat. No. 11,030,826.

(60) Provisional application No. 62/891,920, filed on Aug. 26, 2019.

(51) Int. Cl.
*G06T 19/20* (2011.01)
*G06F 3/0482* (2013.01)
*G06Q 10/20* (2023.01)
*G06Q 50/08* (2012.01)

(52) U.S. Cl.
CPC ............ *G06T 19/20* (2013.01); *G06F 3/0482* (2013.01); *G06Q 10/20* (2013.01); *G06Q 50/08* (2013.01); *G06T 2200/24* (2013.01); *G06T 2219/2004* (2013.01); *G06T 2219/2016* (2013.01)

(58) Field of Classification Search
CPC ................. G06T 19/20; G06T 2200/24; G06T 2219/2004; G06T 2219/2016; G06F 3/0482; G06Q 10/20; G06Q 50/08
See application file for complete search history.

(56) References Cited

U.S. PATENT DOCUMENTS

| 2003/0167155 A1* | 9/2003 | Reghetti | ................. G10L 15/26 704/E15.045 |
| 2006/0247902 A1* | 11/2006 | Rourke | .................... G06F 30/15 703/1 |
| 2007/0186149 A1 | 8/2007 | Ghantous | |

(Continued)

*Primary Examiner* — YuJang Tswei
(74) *Attorney, Agent, or Firm* — Clayton, McKay & Bailey, PC

(57) ABSTRACT

Technologies are provided for automated configuration of hanger placement within a model layout in a computer-aided design (CAD) application. The technologies rely, in some embodiments, on an initial selection of pipe elements and a traversal direction. Candidate positions for placement of hangers are then generated. At each candidate position, a set of pipes essentially parallel to one another can be identified. When the set of pipes includes two or more pipes, the candidate position is deemed to be satisfactory and placement of a hanger at the candidate position can be configured. The configuration includes configuration of a size of a hanger bearer relative to the pipe elements present in such a set. The configuration also includes configuration of an elevation of the hanger. A termination rule can be utilized to terminate the generation of candidate positions and associated configuration of hanger placement.

17 Claims, 7 Drawing Sheets

(56) References Cited

U.S. PATENT DOCUMENTS

| | | |
|---|---|---|
| 2007/0271507 A1 | 11/2007 | Connor |
| 2008/0027684 A1 | 1/2008 | Inzinga |
| 2008/0275674 A1 | 11/2008 | Reghetti |
| 2013/0211795 A1 | 8/2013 | Vanker |
| 2015/0029181 A1 | 1/2015 | Lerey |
| 2015/0059911 A1* | 3/2015 | Petrov ................... B29C 48/902 |
| | | 264/171.12 |
| 2015/0269247 A1* | 9/2015 | Herold .................. G06F 16/288 |
| | | 707/756 |
| 2016/0160515 A1 | 6/2016 | Wallance |
| 2016/0208979 A1* | 7/2016 | Lange ................... F16L 59/135 |
| 2017/0277824 A1 | 9/2017 | Fei |
| 2018/0154736 A1* | 6/2018 | Augele ............... F24F 13/0209 |
| 2019/0195251 A1* | 6/2019 | Bodwell ................... F16B 2/04 |

* cited by examiner

HANGER GENERATION IN COMPUTER-AIDED DESIGN PROGRAMS

CROSS-REFERENCE TO RELATED APPLICATION

This application claims the benefit of and priority to U.S. Provisional Application No. 62/891,920, titled "Hanger Generation in Computer-Aided Design Programs," filed on Aug. 26, 2019, the contents of which application are hereby incorporated herein by reference in their entireties.

BACKGROUND

Computer-aided design (CAD) software allows users to design structures for construction, among other things. One type of CAD software is Building Information Modeling (BIM) software, which allows users to elaborately design three-dimensional structures. AUTODESK UNIT is one type of BIM software that can be used to design complex buildings all the way down to components and assemblies for use in a project. For example, a user can model an entire plumbing or electrical installation within a building.

BIM software, such as AUTODESK REVIT, allows the user to visually layout pipe, HVAC ductwork, or electrical conduit inside of building plans Such pipe, ductwork, and conduit are each generically referred to as "pipe elements." However, placing hangers for these pipe elements at appropriate spans is painstaking and not practical. For example, it is difficult to see if the hangers are aligned with the pipe elements. In addition, the hangers have spacing requirements for supporting these pipe elements, and it is difficult to determine by inspection appropriate locations to place the hangers. Even then, if a pipe element is moved, the hangers do not move with the pipe element. This is because existing software only associates the hanger with a single element rather than multiple. Thus, at most, each hanger can only be associated with one pipe element, whereas many pipe elements can be resting on a single hanger. Despite these challenges, users are largely limited to using AUTODESK REVIT and other already available CAD programs because of their ubiquitous adoption within the industry.

Therefore, a need exists for technologies that can provide automatic hanger generation for runs of hangers based on existing sets of pipe elements.

SUMMARY

The examples described herein specifically address technical problems and limitations of REIT and similar BIM software. The examples include a computing device, such as a personal computer, tablet, or laptop, that executes a CAD application, such as REVIT. The application can include an application programming interface (API) that interacts with a plugin that can provide additional functionality for placing hangers on runs of pipe elements within the GUI. The plugin can do so by automatically placing hangers, avoiding conflicts with multiple pipe elements, grouping branches with some pipe elements go in different directions, and resizing bearer width based on the pipe element span.

The method can be defined by instructions in a non-transitory, computer-readable medium. A processor can execute the instructions in a system.

In one example, a graphical user interface ("GUI") can receive a first selection of elements shown on the QUI. For example, the user can use a box selection tool. The plugin can determine a first set of pipe elements from the first selection based on the elements being parallel. Non-parallel elements can be excluded from the set of pipe elements. Then, the user can make a second selection on the GUI, such as by clicking a point somewhere on the model. The plugin can use this selection to determine a run direction for providing hangers to the first set.

The plugin can determine a service type for the first set of pipe elements that is one of pipe, conduit, or ducts. This can inform required hanger type, hanger elevation, and hanger spacing. For example, bigger or heavier pipe elements may need stronger, more frequent, or lower-hanging hangers.

The plugin can then place an initial hanger on the first set of pipe elements, including resizing a bearer width to span the first set of pipe elements and changing the hanger elevation to attach to a lowest bottom of the first set of pipe elements. The resizing and location changes can be done by the plugin setting parameters for the hanger element within the CAD application, such as by the plugin making an API call.

Then the plugin or CAD application can place a second hanger at a spacing along a first path of the pipe elements. The required spacing can be defined in a table or database based on the type of pipe elements. The plugin can continue to place hangers at the requisite elevation (e.g., bottom of lowest of the pipe elements) and at the determined spacing until the plugin determines that a branch exists in the first set of pipe elements. This can be indicated by two or more of the pipe elements being parallel to each other but not at least one other pipe element of the first set. Then the plugin can repeat the hanger placement steps down the branch, starting with the initial hanger placement on the branch.

Selecting the elements can also cause the plugin to determine multiple sets of pipe elements. For example, the plugin can determine a second set of pipe elements that includes pipe elements in parallel but in a different direction than the pipe elements of the first set. Any number of such sets can exist in a single selection, allowing the user to rapidly deploy hangers down multiple paths at once. The same initial hanger placement and branch determinations can take place in the other sets of pipe elements.

Similar to detecting a branch, the plugin can also determine that a first pipe element that was part of the first set is no longer part of the first set. To do so, the plugin can detect that the first pipe element diverges from its original distance from a next closest pipe element in the first set, in an example. An API call to the CAD application can be used to detect this distance by supplying a coordinate on one of the pipe elements along with both pipe element identifiers, in an example. The plugin can continue to place hangers at the spacing on the first set so long as the first set includes at least two pipe elements that are parallel to one another and within a threshold distance of one another. This hanger placement can continue until all pipe elements of the first set have turned a corner, in an example.

Both the foregoing general description and the following detailed description are exemplary and explanatory only and are not restrictive of the examples, as claimed.

BRIEF DESCRIPTION OF TUE DRAWINGS

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

The technologies disclosed herein address, at least in some aspects, the issue of automated placement of hangers on runs of pipe elements corresponding to multiple types of services. Thus, the technologies disclosed herein can be used for automated configuration of hanger placement within a model layout in a CAD application, where the model layout includes multiple types of pipe elements. The disclosed technologies rely, in some embodiments, on an initial selection of multiple pipe elements and a traversal direction. The multiple pipe elements can correspond to different types of set services. The traversal direction can identify an initial direction for the iterative generation of candidate positions for placement of hangers. At each candidate position, a set of pipes essentially parallel to one another may be identified. Geometric rules can be applied to identify such a set. For instance, the geometric rules can dictate a relative orientation that must be satisfied by the pipes in the set. The geometric rules also can dictate a relative elevation that must be satisfied by the pipes in the set. The geometric rules can further dictate a relative in-plane separation that must be satisfied by the pipes in the set.

Regardless of the particular geometric rules that are applied, when the identified set of pipes includes two or more pipes, the candidate position is deemed to be satisfactory. As a result, placement of a hanger at the candidate position can be configured. The configuration includes configuration of a size of a hanger bearer relative to the pipe elements present in such a set. The hanger bearer size can be configured to match the span of the pipe elements along a direction perpendicular to the direction along which hangers are being placed. Such a direction may be the initial traversal direction or another traversal direction resulting from the subsequent traversal of the model layout. The configuration of the hanger placement also includes configuration of an elevation of the hanger. A termination rule can be utilized to terminate the generation of candidate positions and associated configuration of hanger placement.

Figure 1:
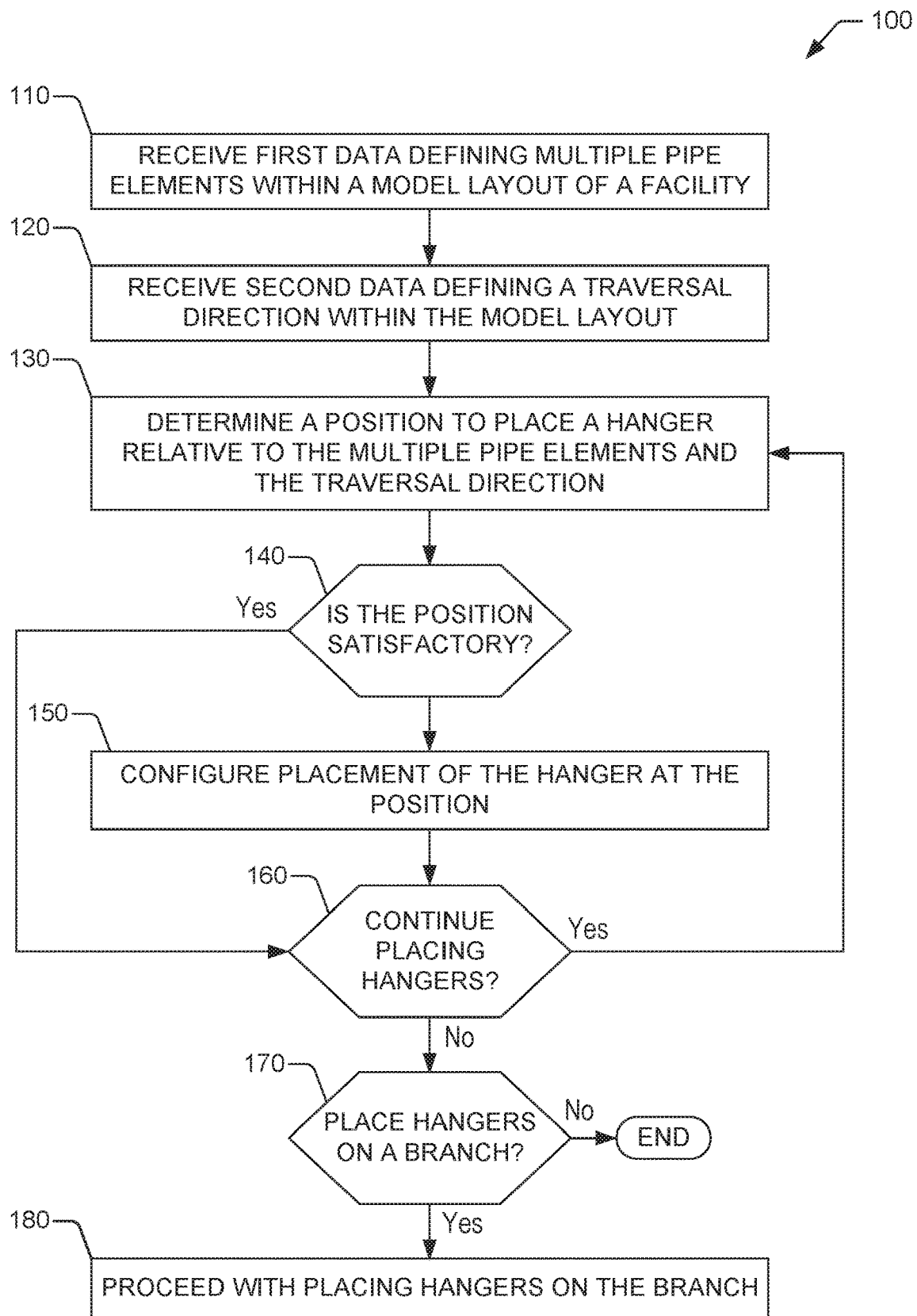
FIG. 1 illustrates an example of a method for automatically placing hanger elements in a CAD application, such as AUTODESK REVIT, in accordance with one or more embodiments of this disclosure.

FIG. 1 illustrates an example of a method 100 for automatically placing hanger elements in a CAD application, such as AUTODESK REVIT, or another type of BIM program, in accordance with one or more embodiments of this disclosure. A plugin executing as part of the CAD application can perform one or several of the stages in the example method 100.

At stage 110, the plugin can receive first data defining multiple pipe elements. For example, a graphical user interface (GUI) can show multiple pipe elements, such as conduit or plumbing and fittings, that are part of a model layout. The user can select multiple of those pipe elements to define a set of selected pipe elements.

Those pipe elements can be arranged within a model layout of a facility, such as a building or another type of customer premises. In some cases, the multiple pipe elements can correspond to various services, such as a combination of power service, water service, gas service, and heating, ventilation, and air conditioning (HVAC). Thus, in one example, the multiple pipe elements can constitute a combination of an electrical assembly, a plumbing assembly, and an HVAC assembly.

The first data can be generated by selecting visual elements on a GUI presenting, entirely or partially, the model layout. The selected visual elements correspond to respective ones of the multiple pipe elements. In some configurations, a visual element can be selected by clicking or tapping on a section of the model layout presented in the GUI. The selection can cause the plugin to be notified of what was selected.

The plugin can determine a first set of pipe elements from the first selection based on the elements being parallel. For example the selection can be a box drawn around multiple elements, but one or more sets can be determined based on which of those pipe elements are in parallel. In some instances, the plugin can determine multiple such sets, such as when multiple groups of pipes run parallel in different directions. This can cause the plugin to simultaneously provide hangers for multiple different sets that head in different directions.

The plugin can also exclude pipe elements or other elements that are not in parallel with the pipe elements of any of the identified sets. For example, if a pipe is not parallel to the pipes of first and second sets, that pipe can be excluded from inclusion in either set.

At stage 120, the plugin can receive second data defining a traversal direction within the model layout. This can include receiving a second selection of a point within the GUI. The point can represent a traversal location within the model being shown on the GUI.

The plugin can find the shortest pipe from the selected pipes of stage 110 and then calculate which end of that pipe is closer to the selected point of stage 120, In one example, the Closer end of the pipe is considered the ending point and the further end of the pipe is considered the starting point. The starting and ending points can dictate the traverse direction.

The traversal direction can indicate an initial direction along which hanger elements are to be placed. As such, the traversal direction can be referred to as a run direction. The traversal direction can be defined by a vector having an origin point and an ending point within the model layout. The second data can be generated by interacting with the GUI presenting the model layout. In one configuration, the origin point can be selected by clicking or tapping on a first position in a visual element corresponding to one of the multiple pipe elements. The ending point can then be selected by clicking or tapping on second position in the visual element. In another configuration, the origin point can be pre-configured as an end position of a pipe element. Thus, the traversal direction can be defined by selecting the ending point the pipe element, as is described above.

At stage 130, the plugin can determine a position to place a hanger relative to the multiple pipe elements and the traversal direction. Such a position is a candidate position in that the arrangement of the multiple pipe elements at the position that has been determined may not permit the placement of a hanger. As such, at stage 140, the plugin can determine if the position is satisfactory hanger placement.

Figure 2:
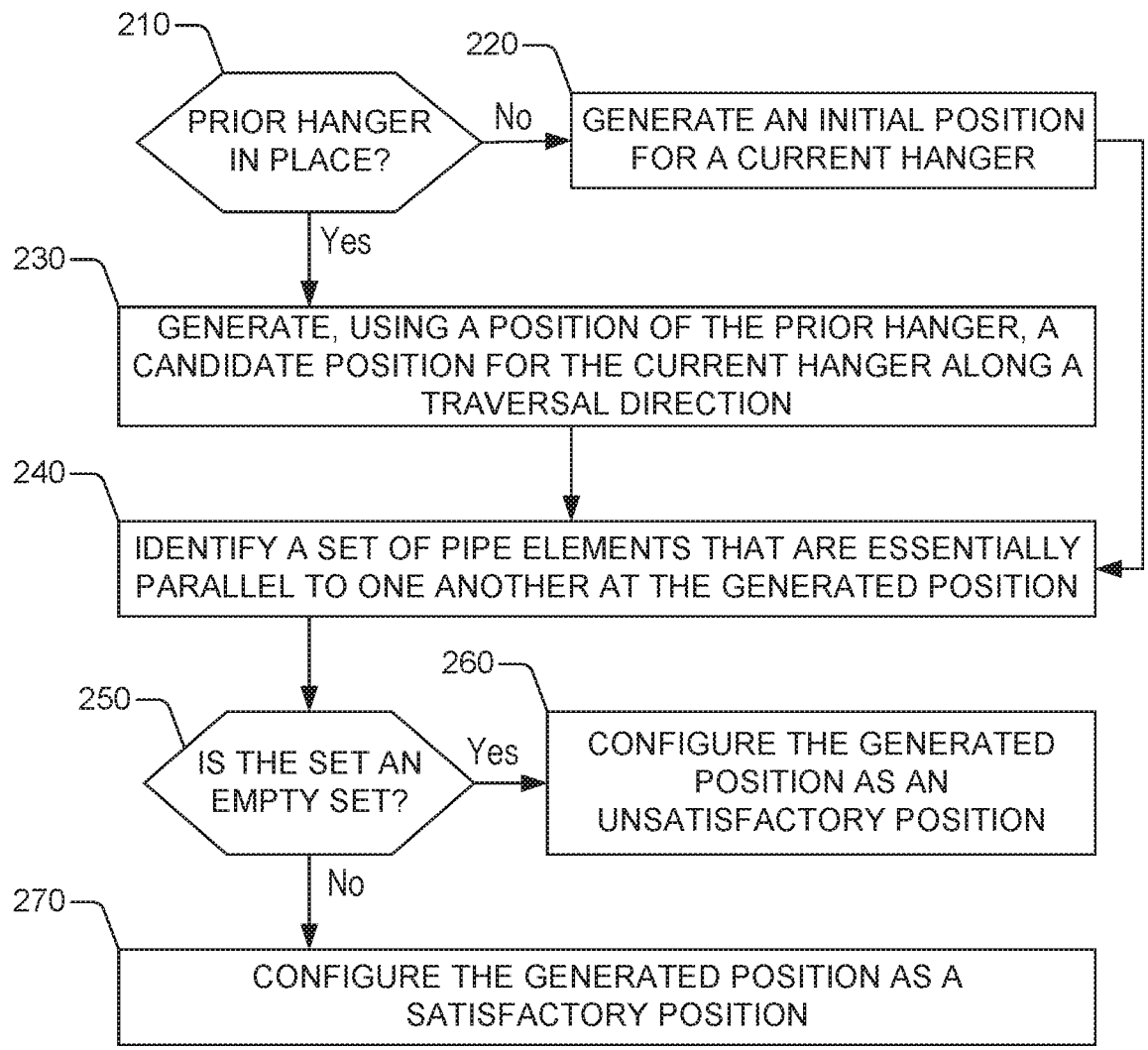
FIG. 2 illustrates an example of a method for identifying a candidate position for placement of a hanger element in a CAD application, in accordance with one or more embodiments of this disclosure.

More concretely, FIG. 2 illustrates a flowchart of an example method 200 for implementing both stages 130 and 140. At stage 210, the plugin can determine if a prior hanger is in place relative to the multiple pipe elements and the traversal direction. In response to a negative determination ("No" outcome of stage 210) the plugin can generate an initial position for a current hanger. In one example, the initial position can be determined relative to an end of a pipe element within the multiple pipe elements defined at stage 110 (FIG. 1). In the alternative, in response to a positive determination ("Yes" outcome of stage 210) the plugin can generate a candidate position for the current hanger along the traversal direction. The candidate position can be generated by adding a defined spacing along the traversal direction. The defined spacing can be 8 ft, in One example.

The flow of the example method 200 can continue to stage 240 after the plugin has implemented either one of the stage 220 or the stage 230. At stage 240, the plugin can identify a set of pipe elements that are essentially parallel to one another at the position that has been generated (either the initial position or the candidate position). In one configuration, a first pipe element and a second pipe element having respective orientations forming an angle not exceeding a defined threshold angle are determined to be essentially parallel. Simply as an illustration, the defined threshold angle can be one degree, two degrees, three degrees, or four degrees.

In order to identify the set of pipes that are essentially parallel to one another at the position that has been generated, the plugin can determine that each pipe within the set of pipe is separated from other pipes by at least a threshold distance. In one configuration, the threshold distance can be determined based on a minimum distance ($d_{min}$) between pipe elements in an initial set of pipes. The threshold distance can be proportional to $d_{min}$. For instance, the threshold distance can be $1.5 \times d_{min}$. In other configurations, rather than relying on $d_{min}$, other separations within the initial set can be considered, e.g., average separation or maximum separation.

In addition, or in some embodiments, in order to identify the set of pipes that are essentially parallel to one another at the position that has been generated, the plugin can identify one or several pipes that overlap in elevation. In instances in which the vertical separation of a particular pipe from other pipes exceeds a threshold distance, then the particular pipe can be excluded from the set that is being identified.

At stage 250, the plugin can determine if the set is an empty set. In response to a positive determination ("Yes" Outcome of stage 250) the plugin can configure the generated position an unsatisfactory position for the current hanger. In the alternative, in response to a negative determination ("No" outcome of stage 250) the plugin can configure the generated position as a satisfactory position.

The plugin can adjust a candidate position that has been determined to be a satisfactory position in order to place a hanger at least at a defined threshold distance from a reducer, a veld, a fitting, a connection, transition, an offset, or similar. An example of a defined threshold distance is four inches. The plugin can also set the elevation of the hanger at the candidate position to the elevation of the current hanger. This can include making an APT call to the CAD application, identifying the hanger element, and identifying the coordinate height. The plugin can do this to ensure that the elevation remains the same. The hanger elevation can be set to attach to a lowest bottom of the set of pipe elements.

With further reference to FIG. 1, at stage 150, the plugin can configure placement of the hanger at the location to place the hanger. To that end, the plugin can generate first assembly data defining a bearer length of the hanger. The plugin can determine the bearer length by determining a span of defined pipe elements of the multiple pipe elements along a transversal direction essentially perpendicular to the traversal direction. In some cases, the plugin can then configure such a span as the bearer length, and can generate the first data accordingly. In other oases, the plugin can adjust the determined span to a least multiple of two-inches that is greater than or equal to the determined span. In other words, the plugin can round up the determined span to a multiple of two inches. The plugin can then configure the bearer length as the adjusted span. Such an adjustment in those configurations yields a bearer length that is compatible with hanger parameters available in AUTODESK REVIT and manufactured hanger bearers.

In addition, to configure the placement of the hanger at a particular location, the plugin can generate second assembly data defining an elevation of the hanger relative to the defined pipe elements utilized to determine the bearer length. Because the defined pipe elements can be positioned at different elevations and can have different yet overlapping vertical extents, the plugin can determine the elevation of the hanger by determining a least elevated element of the defined pipe elements. The plugin can execute a function call of an API of the CAD application to receive geometry information of the model layout that can be used to determine the least elevated element. The plugin can then configure the elevation of the hanger as a height of a bottom surface of the least elevated element, By determining a single elevation for the hanger, the second assembly data can be readily used in a CAD application (such as AUTODESK REVIT) in which an individual hanger is limited to being logically associated with an individual part, rather than being able to be logically associated with several parts within a rack.

In situations in which a prior hanger has been placed relative to the multiple pipe elements and the traversal direction, the plugin can uniformize the elevation of the prior hanger and a current hanger. Thus, the plugin can determine a minimum elevation between the elevation of the prior hanger and the elevation of the current hanger. The plugin can retain the elevation of the least elevated hanger and can update the elevation of the most elevated hanger to correspond to the minimum elevation. For example, the prior hanger can be the least-elevated hanger and the current hanger can be the most-elevated hanger. As such, the plugin can update the elevation of the current hanger to correspond to the minimum elevation, and also can update the second assembly data to define the minimum elevation. The first assembly data defining the bearer length of the hanger and the second assembly data defining the elevation of the hanger can define the placement of hanger within the model layout.

At stage 160, the plugin can determine if hanger placement is to be continued. In response to a positive determination ("Yes" outcome of stage 150), the flow of the example method 100 can return to stage 130. In the alternative, in response to a negative determination ("No" outcome of stage 150), the flow of the example method 100 can continue to stage 170 where the plugin can perform another test. Specifically, at stage 170, the plugin can determine if additional hangers are to be placed on a branch of pipe elements present in the model layout. Determining that hangers are not to be placed on the branch ("No" outcome of stage 160) can result in the termination of the example method TOO. In the alternative, determining that hangers are to be placed on the branch ("No" outcome of stage 160) can result in the flow continuing to stage 170 where the plugin can proceed with placing hangers on the branch.

Figure 3:
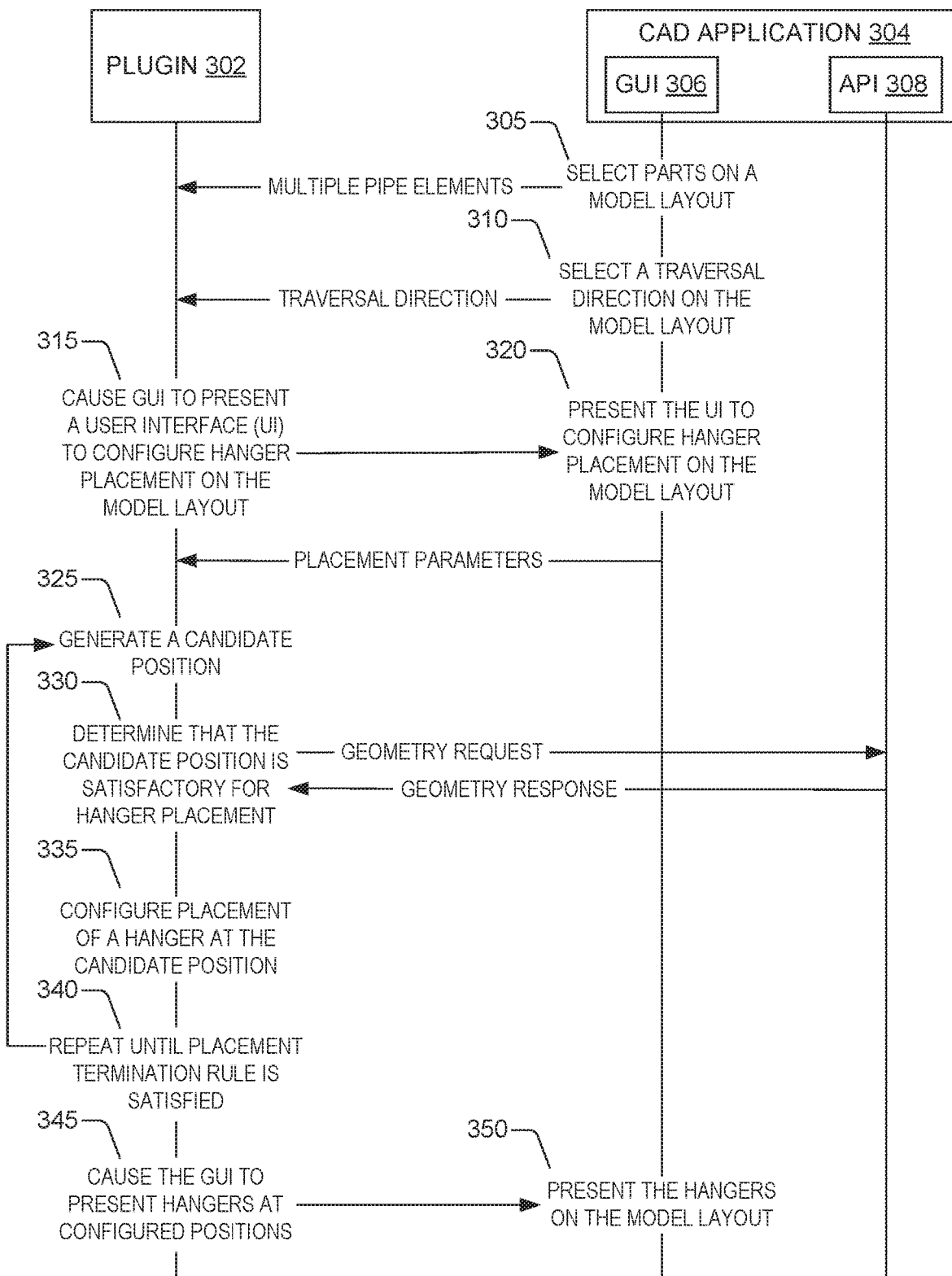
FIG. 3 illustrates a sequence diagram for automatically placing hanger elements in a CAD application, such as AUTODESK REM, in accordance with one or more embodiments of this disclosure.

FIG. 3 illustrates a sequence diagram 300 of an example process far automated placement of hangers in a multiservice part, in accordance with one or more embodiments of this disclosure. At stage 305, a GUI 306 can receive input data to select multiple pipe elements on a model layout. As mentioned, the model layout can be defined using a. CAD application 304. At stage 310, the GUI 306 can receive input data to select a traversal direction on the model layout 310. The GUI 306 can send first data defining multiple pipe elements and second data defining the traversal direction to the plugin 302.

Figure 4A:
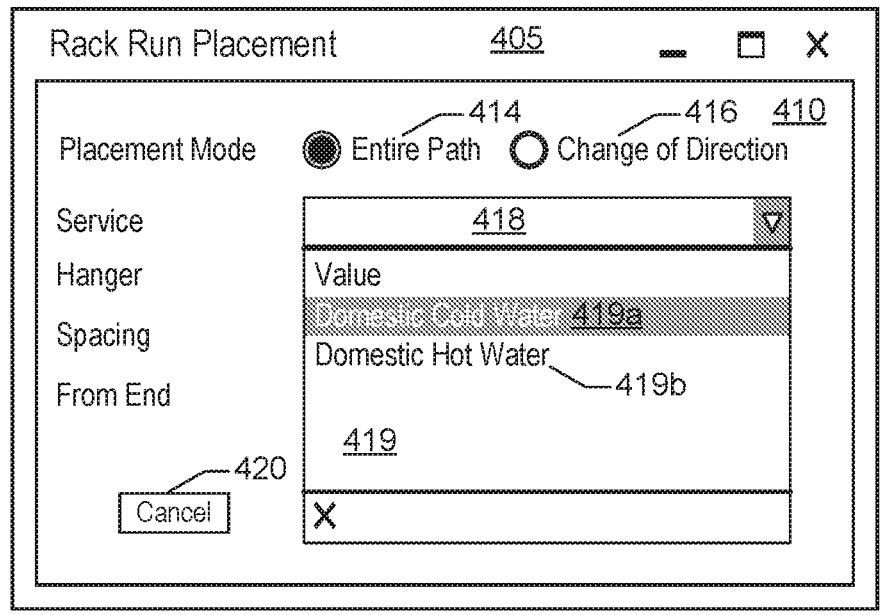
FIG. 4A illustrates an example of a GUI for configuring placement of a hanger on a model layout, in accordance with one or more embodiments of this disclosure. The illustrated GUI permits specifying a placement mode and a type of service based on a prior selection of multiple pipe elements.

At stage 315, a plugin 302 can cause the GUI 306 to present a user interface (UI) to configure hanger placement. The GUT 306 can be presented by a CAD application 304. At stage 315, the GUI 306 can present the UI to configure hanger placement on the model layout. The UI can include multiple selectable UI elements that, in response to selection, can permit inputting data to configure hanger placement. An example of the UI is illustrated in FIG. 4A.

The GUI 306 can send placement parameters to the plugin 302. The placement parameters can include a mode of placement. The mode of placement defines a termination rule for placement of hangers on the model layout. In one example, the mode of placement cart be, one of (1) "Entire Path" or (2) "change of Direction." In mode (1), hangers can be placed throughout the model layout, starting from the selected multiple pipe elements. In mode (2), hanger placement continues until each pipe element on a placement path has changed direction or a single pipe element is left. This mode can be used to place hangers in straight away sections. The nomenclature utilized to identify those modes is simply illustrative. Other terminology can be utilized to identify those modes. As is depicted in FIG. 4A, an example of the GUI 306 can include a UI 405 having a pane 410 that includes a first selectable UI element 414 and a second selectable UI element 416. Selection of one of the selectable UI elements 414 or 416 can cause the GUI 306 to generate data defining a mode of placement.

Back to FIG. 3, at stage 320, the plugin 302 can generate a candidate position relative to the multiple pipe elements and a traversal direction. The traversal direction can be received as part of the placement parameters.

At stage 325, the plugin 302 can determine that the candidate position is satisfactory for placement of a hanger. To that end, the plugin 302 can implement the example method 200 shown in FIG. 2. Such an implementation can include executing one or several function calls to an API 308. The function call(s) constitute a geometry request to the API 308. The API 308 can send a geometry response including data identifying an array of points indicative of positions of pipe(s) present in a vicinity of the candidate position. The geometry response also can include data identifying other elements present, in the vicinity of the candidate position. Those other elements can include elbows, tees, reducers, and the like.

At stage 330, the 302 can configure placement of a hanger at the candidate position. Thus, the plugin 302 can configure bearer length of the hanger and elevation of the hanger, for example. Hanger type of the hanger to be placed can be determined by the placement parameters received from the GUI 306. Specifically, in one example, the UI 405 shown in FIG. 4A can include a selectable visual element 418. Selection of the visual element 418 can cause the GUI 306 to present a menu 419 of services corresponding to the multiple pipe elements selected by means of the GUI 306 at stage 305. The selectable visual element 418 can be selected by clicking or tapping on the visual element 418, for example. The menu 419 can include a selectable visual element 419a that, in response to being selected, can configure a first type of service (e.g., domestic cold water). The menu 419 also can include a second selectable visual element 4191) that, in response to being selected, can configure a second type of service (e.g., domestic hot water). In the menu 419, the selectable visual element 419a is depicted as being selected.

Figure 4B:
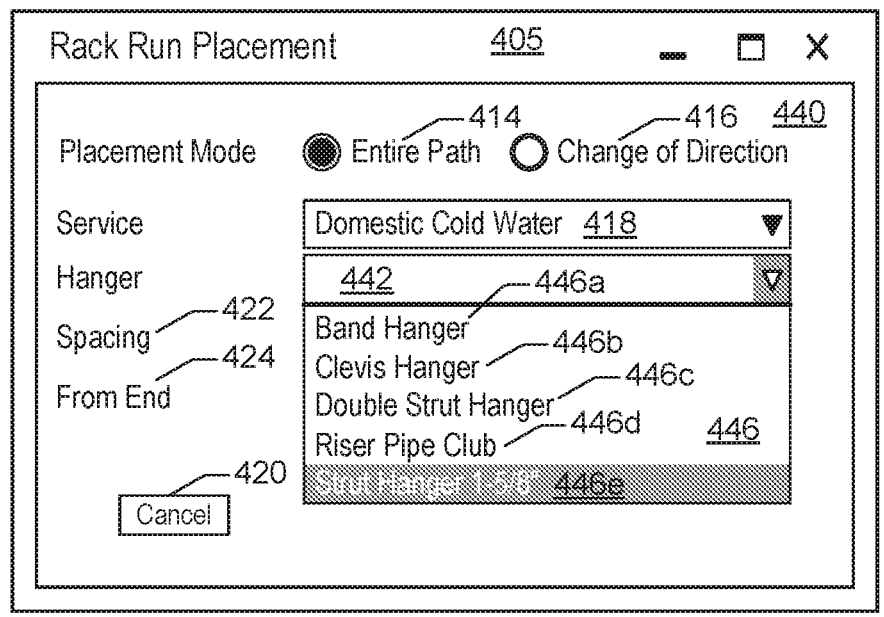
FIG. 4B illustrates another example of a GUI for configuring placement of a hanger on a model layout, in accordance with one or more embodiments of this disclosure. The illustrated GUI permits specifying a type of hanger based on the service selection made using the GUI illustrated in FIG. 4A.

As is shown in FIG. 4B, selection of the selectable visual element 419 can cause the GUI 306 to present a pane 440 in which a service is selected (see element 418). After the service has been selected, a selectable visual element 442 can be selected in order to configure a type of hanger to be placed on the model layout presented in the GUI 306. The selectable visual element 442 can be selected by clicking or tapping on the visual element 442, for example, Selection of the selectable visual element 442 can result in the presentation of a menu 446.

As is illustrated in FIG. 4B, the menu 422 can include multiple selectable visual elements that can be used to configure a type of hanger. The type of hanger can be specific to the selected type of service (e.g., domestic cold water; see UI element 418). More concretely, the menu 446 can include a first selectable UI element 446a that, in response to selection, can cause configuration of a first type of hanger (e.g., band hanger). The menu 446 also can include a second selectable. UI element 446b that, in response to selection, can cause configuration of a second type of hanger (e.g., clevis hanger). The menu 446 also can include a third selectable UI element 446c that, in response to selection, can cause configuration of a third type of hanger (e.g., double strut hanger). The menu 446 can further include a fourth selectable UI element 446d that, in response to selection, can cause configuration of a fourth type of hanger (e.g., riser pipe club). The menu 446 can further include a fifth selectable UI element 446e that, in response to selection, can cause configuration of a fifth type of hanger (e.g., strut hanger 1⅝θ).

Figure 4C:
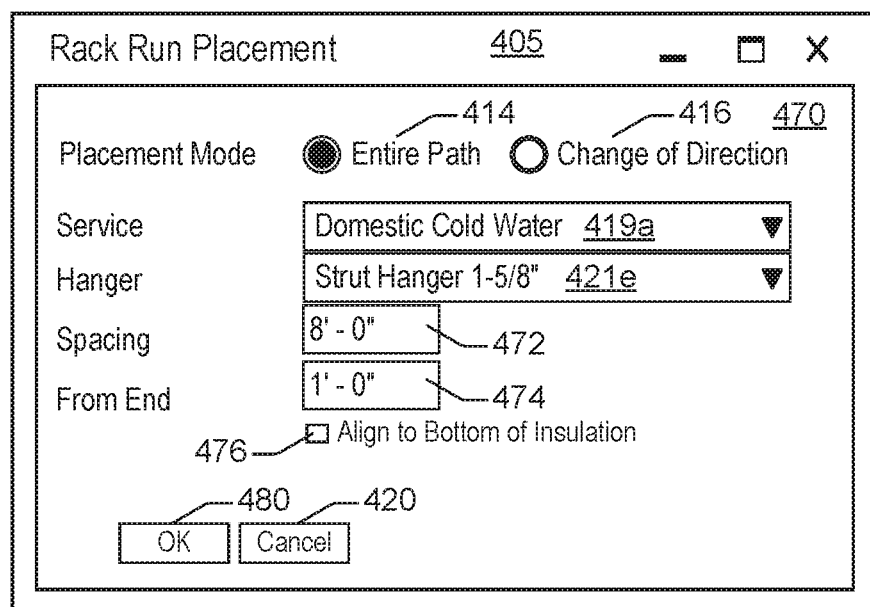
FIG. 4C illustrates yet another example of a GUI for configuring placement of a hanger on a model layout, in accordance with one or more embodiments of this disclosure. The illustrated GUI permits specifying a spacing between hangers and a threshold distance from an end of a pipe element.

After service and hanger types have been configured, the UI 405 can present a pane 470 as is illustrated in FIG. 4C. The panel 470 can include a first selectable UI element 472 and a second selectable UI element 474 that can be used to further configure placement parameters. Selection of first selectable UI element 472 can permit defining a spacing between hangers along a straight section of a run of pipe elements. For example, the spacing can be 8 ft. Other spacings also can be configured.

Selection of the second selectable UI element 474 can permit defining an end distance separation between a hanger and an end (termination point or corner/change of direction, for example). The end distance separation applies to placement before a change of direction of a pipe element and after the change of direction. The end distance separation can be less than a defined spacing between hangers (e.g., 4 ft, 5 ft, 6 ft, 7 ft, 8 ft, 9 ft, or 10 ft). For instance, such an end distance separation can be 1 ft. Other end distance separation also can be configured.

At stage 335 in FIG. 3, the plugin 302 can repeat stages 320, 325, and 33Q until the placement termination rule defined by the mode of placements is satisfied. At stage 340, the plugin 302 can cause the GUI 306 to present the hangers on the model layout at stage 345. In one configuration, the plugin 302 can send an instruction to present the hangers. The instruction can include payload data defining an arrangement of the hangers within the model layout. The arrangement can define position and size of each one of the hangers. The payload data also can include metadata defining the type of hanger to be presented.

Figure 5:
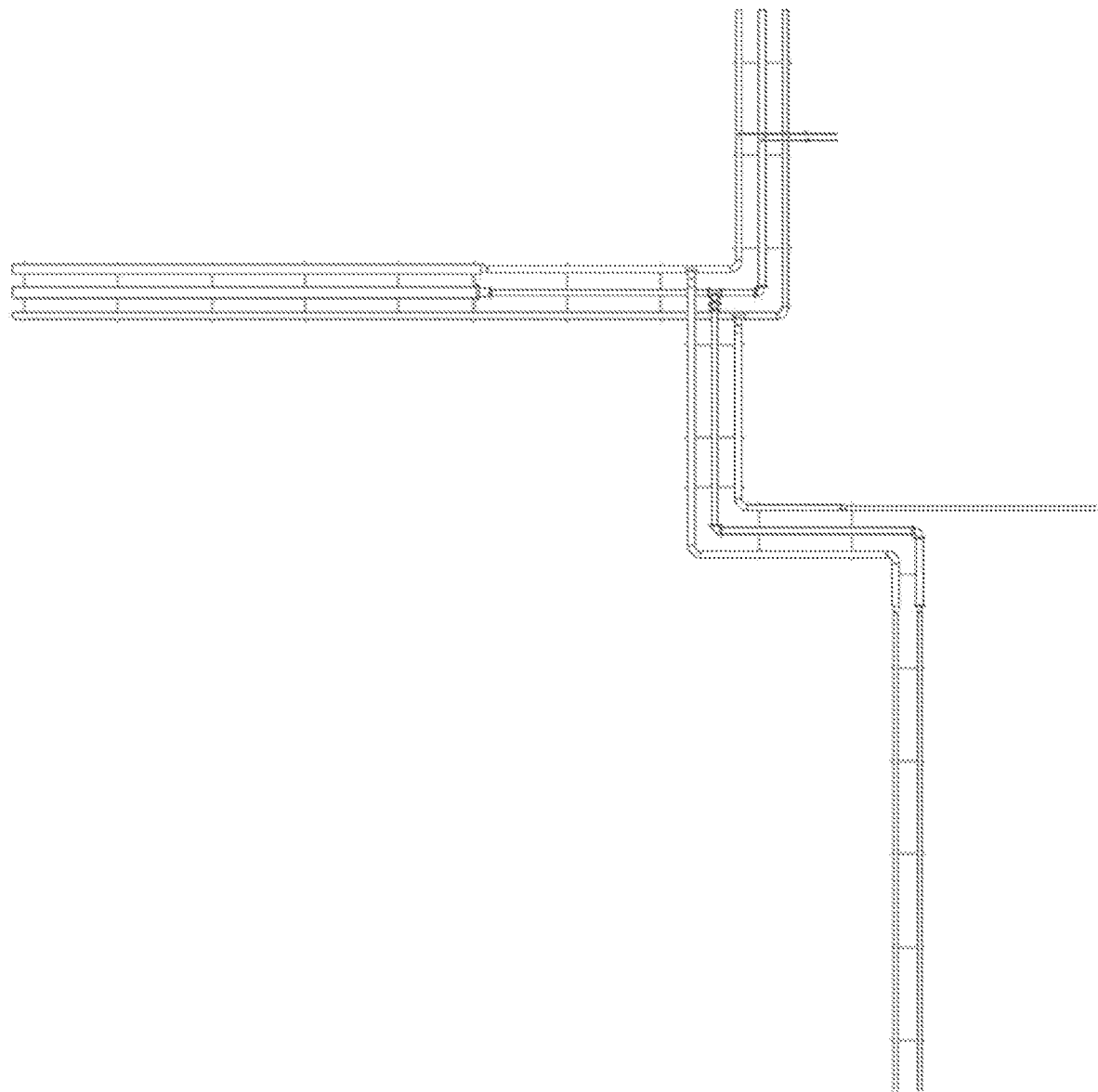
FIG. 5 is an example illustration of a GUI for automatically placing hanger elements in a CAD application, such as AUTODESK REVIT, in accordance with one or More embodiments of this disclosure.

In response, the GUI 306 can present the hangers at stage 350. FIG. 5 illustrates an example of a UI presenting a model layout and UI elements corresponding to respective hangers.

Figure 6:
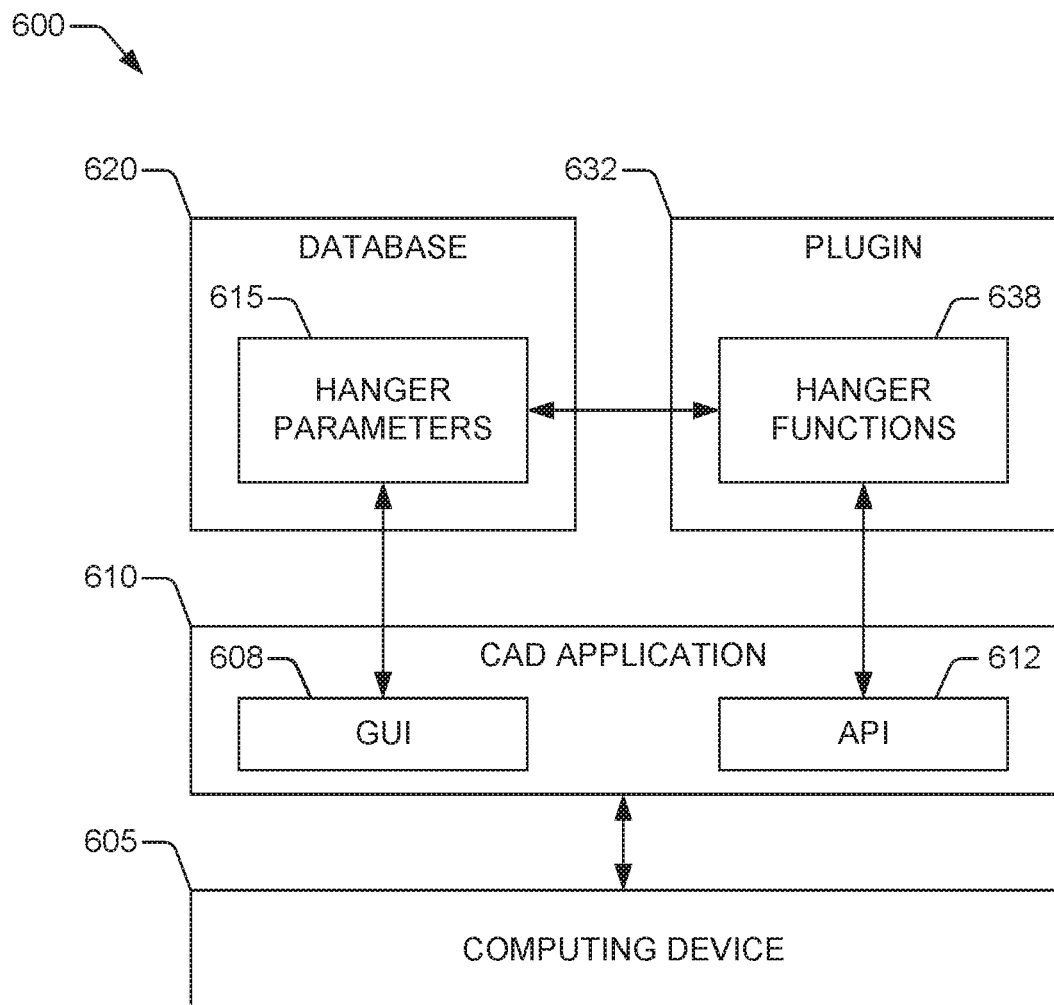
FIG. 6 is an example illustration of system components, in accordance with one or more embodiments of this disclosure.

FIG. 6 includes an example diagram of a system 600 in accordance with one or more embodiments of this disclosure. A CAD application 610 can execute on a computing device 605. The CAD application 610, such as AUTODESK REVIT, includes a GUI 608 used to create and display a design layout. Using the system 400, designers can create models of nearly any type of physical object, including dwellings and other structures. In one example electrical, plumbing, or HVAC assemblies can also be designed. The CAD application 610 can be embodied in, or can include, AUTODESK REVIT or another type of BIM program.

The computing device 105 can be any processor-based device, such as a personal computer, laptop, tablet, or cell phone. It can also include or be part of a server in one example. The computing device 605 can display the GUI 608 by executing a set of instructions stored locally or remotely on a computer-readable medium. The computing device 605 can also execute the plugin 632 in one example. In another example, the plugin 632 can be an application that executes remotely on a server that is accessed by the computing device 605. The plugin 632 can be executed as part of the CAD application 610 (e.g., AUTODESK REVIT, another BIM application, or similar).

The plugin 632 can improve the GUI 608 of CAD application 610 or another BIM application. For example, the plugin 632 can allow the GUI 608 to display options and screens for automatically providing hangers and adjusting hanger positions based on sets of pipe elements. For example, the GUI 608 can display screens for placement-related hanger parameters. The user can modify these on the GUI 608. The user can also select parts, such as horizontal pipe or duct runs, to which the hanger placement functions can apply.

In one example, a database 620 stores hanger parameters 615. The hanger parameters 615 can be imported from and exported into different projects of the CAD application 610 (such as AUTODESK REVIT projects) in one example. The hanger parameters 615 can ensure, proper hanger placement locations and spacing based on different part types and materials. For example, the hanger parameters 615 can account for part lengths, widths, bends, and connector information.

The plugin 432 can execute function calls to an API 612 to the CAD application 610 for a variety of purposes, including determining orientation of pipe elements, adjusting elevation of hangers, avoiding end points, connectors, welds, reduces, and the like.

The database 620 can be implemented by any type of computing device. In one example, the database 620 is part of computing device 605. In another example, the database 620 is remotely accessible by the computing device 605, such as over a network. The network can be a local area network, an enterprise network, or the Internet. In one example, multiple computing devices 605 in an enterprise can remotely access the database 620 over the network. This can allow for centralized storage of the hanger parameters 615, allowing for some administrative users to optimally set the parameters that are then available for other users to implement in projects.

Using the API 612, the CAD application 610 can execute custom methods for the plugin 632 when defined events occur within the CAD application 610. Custom methods can include new procedures that are part of plugin 632. Events can be generated when an action is submitted to a server device that hosts the CAI) application 610, for performance by the CAD application 610. The plugin 632 can implement the events to cause CAD application 610 to communicate with the plugin 632. The plugin 632 then can execute custom methods for customized functionality.

The plugin 632 can further provide functionality for outputting the hanger placements, such as in a comma-delimited file. This can allow workers in the field to correctly place the hangers during part installation.

Although a plugin 632 is used in a preferred example, in another example the same functionality is built into the CAD application 610 itself. All of the examples still apply to that configuration.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as illustrative only, with a true scope and spirit of the disclosure being indicated by the following claims.

What is claimed is:

1. A system for hanger placement in a computer-aided design ("CAD") application, including:
   a database that stores hanger parameters;
   a processor that executes instructions to perform stages comprising:
      receiving a first selection of elements on a graphical user interface ("GUI");
      determine a first set of pipe elements from the first selection based on the elements being parallel;
      receiving a second selection, on the GUI, indicating a run direction;

determining a service type for the first set of pipe elements that is one of pipe, conduit, or ducts;

placing an initial hanger on the first set of pipe elements, including resizing a bearer width to span the first set of pipe elements and changing the hanger elevation to attach to a lowest bottom of the first set of pipe elements;

placing a second hanger at a spacing along a first path of the first set of pipe elements;

determining that a first pipe element that was part of the first set is no longer part of the first set based on the first pipe element diverging from its original distance from a next closest pipe element in the first set;

determining a branch of the first set of pipe elements in an instance where two pipe elements in the set diverge from one another; and repeating the initial hanger placement on the branch, wherein hanger placement continues until all pipe elements of the first set have turned a corner, and wherein the first set includes pipe elements of different types.

2. The system of claim 1, wherein determining the first set of pipe elements includes excluding a first element based on the first element not being parallel to the pipe elements of the first set.

3. The system of claim 1, the stages further comprising determining a second set of pipe elements from the first selection, wherein the second set is a different element type or parallel in a different direction than the pipe elements of the first set.

4. The system of claim 1, the stages further comprising repeating the initial hanger placement and branch determination from the second set of pipe elements.

5. The system of claim 1, the stages further continuing to place hangers at the spacing on the first set so long as the first set includes at least two pipe elements that are parallel to one another and within a threshold distance of one another.

6. A method for hanger placement within a REVIT plan, comprising:

receiving a first selection of elements on a graphical user interface ("GUI");

determining a first set of pipe elements from the first selection based on the elements being parallel;

receiving a second selection, on the GUI, indicating a run direction;

determining a service type for the first set of pipe elements that is one of pipe, conduit, or ducts;

placing an initial hanger on the first set of pipe elements, including resizing a bearer width to span the first set of pipe elements and changing the hanger elevation to attach to a lowest bottom of the first set of pipe elements;

placing a second hanger at a spacing along a first path of the first set of pipe elements;

determining a branch of the first set of pipe elements in an instance where two pipe elements in the set diverge from one another; and repeating the initial hanger placement on the branch, wherein hanger placement continues until all pipe elements of the first set have turned a corner, and wherein the first set includes pipe elements of different types.

7. The method of claim 6, wherein determining the first set of pipe elements includes excluding a first element based on the first element not being parallel to the pipe elements of the first set.

8. The method of claim 6, further comprising determining a second set of pipe elements from the first selection, wherein the second set is a different element type or parallel in a different direction than the pipe elements of the first set.

9. The method of claim 6, further comprising repeating the initial hanger placement and branch determination from the second set of pipe elements.

10. The method of claim 6, further comprising determining that a first pipe element that was part of the first set is no longer part of the first set based on the first pipe element diverging from its original distance from a next closest pipe element in the first set.

11. The method of claim 6, further comprising continuing to place hangers at the spacing on the first set so long as the first set includes at least two pipe elements that are parallel to one another and within a threshold distance of one another.

12. A non-transitory, computer-readable medium containing instructions for hanger placement in a computer-aided design application, the instructions causing a processor to execute stages comprising:

receiving a first selection of elements on a graphical user interface ("GUI");

determining a first set of pipe elements from the first selection based on the elements being parallel;

receiving a second selection, on the GUI, indicating a run direction;

determining a service type for the first set of pipe elements that is one of pipe, conduit, or ducts;

placing an initial hanger on the first set of pipe elements, including resizing a bearer width to span the first set of pipe elements and changing the hanger elevation to attach to a lowest bottom of the first set of pipe elements;

placing a second hanger at a spacing along a first path of the first set of pipe elements;

determining a branch of the first set of pipe elements; and repeating the initial hanger placement on the branch.

13. The non-transitory, computer-readable medium of claim 12, wherein determining the first set of pipe elements includes excluding a first element based on the first element not being parallel to the pipe elements of the first set.

14. The non-transitory, computer-readable medium of claim 12, the stages further comprising determining a second set of pipe elements from the first selection, wherein the second set is a different element type or parallel in a different direction than the pipe elements of the first set.

15. The non-transitory, computer-readable medium of claim 12, the stages further comprising repeating the initial hanger placement and branch determination from the second set of pipe elements.

16. The non-transitory computer-readable storage medium of claim 14, wherein the generating the fourth assembly data comprises:

determining a least elevated element of the two or more pipe elements; and configuring the elevation of the second hanger as a height of a bottom surface of the least elevated element of the two or more pipe elements.

17. The non-transitory, computer-readable medium of claim 12, wherein hanger placement continues until all pipe elements of the first set have turned a corner, and wherein the first set includes pipe elements of different types.

* * * * *